(12) United States Patent
Peyton

(10) Patent No.: US 11,272,759 B2
(45) Date of Patent: *Mar. 15, 2022

(54) ARTICLE OF FOOTWEAR AND METHOD OF MANUFACTURING AN ARTICLE OF FOOTWEAR

(71) Applicant: NIKE, Inc., Beaverton, OR (US)

(72) Inventor: Lee D. Peyton, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 194 days.

This patent is subject to a terminal disclaimer.

(21) Appl. No.: 16/713,864

(22) Filed: Dec. 13, 2019

(65) Prior Publication Data
US 2020/0113284 A1    Apr. 16, 2020

Related U.S. Application Data

(63) Continuation of application No. 15/457,375, filed on Mar. 13, 2017, now Pat. No. 10,555,580.

(Continued)

(51) Int. Cl.
*A43B 13/20*   (2006.01)
*A43B 13/12*   (2006.01)
(Continued)

(52) U.S. Cl.
CPC ............... *A43B 13/20* (2013.01); *A43B 3/26* (2013.01); *A43B 13/04* (2013.01); *A43B 13/122* (2013.01);
(Continued)

(58) Field of Classification Search
CPC ......... A43B 13/20; A43B 13/04; A43B 13/12; A43B 13/122; A43B 13/125; A43B 13/16; A43B 13/186; A43B 13/188; A43B 13/189; A43B 13/223; A43B 3/26; A43B 9/00; B29D 35/142; B29D 35/148
USPC ............ 36/102, 97, 25 R; 12/146 B, 146 BP, 12/146 BC, 146 BR, 147 R, 147 A, 12/147 B, 142 J, 142 RS, 142 T, 146 R
See application file for complete search history.

(56) References Cited

U.S. PATENT DOCUMENTS

| | | | |
|---|---|---|---|
| 5,669,161 A * | 9/1997 | Huang | A43B 1/0009 36/29 |
| 10,555,580 B2 * | 2/2020 | Peyton | A43B 13/125 |
| 2014/0230276 A1 * | 8/2014 | Campos, II | B29D 35/128 36/84 |

FOREIGN PATENT DOCUMENTS

| CN | 101291801 A | 10/2008 |
|---|---|---|
| CN | 101632502 A | 1/2010 |

(Continued)

*Primary Examiner* — F Griffin Hall
(74) *Attorney, Agent, or Firm* — Quinn IP Law

(57) ABSTRACT

An article of footwear includes a sole structure including a polymeric bladder element enclosing a fluid-filled interior cavity. The bladder element has a surface with a groove that extends generally parallel with a transverse edge from a lateral side to a medial side, and has a reduced thickness at the groove. A first length along a longitudinal midline of the bladder element from a longitudinal extremity of the bladder element to the groove corresponds with a first footwear size, and a second length along the longitudinal midline of the bladder element from the longitudinal extremity to the transverse edge corresponds with a second footwear size larger than the first footwear size. The sole structure is used in a method of manufacturing an article of footwear.

12 Claims, 10 Drawing Sheets

Related U.S. Application Data

(60) Provisional application No. 62/308,283, filed on Mar. 15, 2016.

(51) Int. Cl.
    *B29D 35/14*     (2010.01)
    *A43B 13/18*     (2006.01)
    *A43B 13/16*     (2006.01)
    *A43B 3/26*     (2006.01)
    *A43B 13/04*     (2006.01)
    *A43B 13/22*     (2006.01)

(52) U.S. Cl.
    CPC ............ *A43B 13/125* (2013.01); *A43B 13/16* (2013.01); *A43B 13/186* (2013.01); *A43B 13/188* (2013.01); *A43B 13/189* (2013.01); *A43B 13/223* (2013.01); *B29D 35/142* (2013.01); *B29D 35/148* (2013.01)

(56) References Cited

FOREIGN PATENT DOCUMENTS

| CN | 102170802 A | | 8/2011 | |
|---|---|---|---|---|
| FR | 2895649 A1 | * | 7/2007 | ............ A43B 13/383 |

* cited by examiner

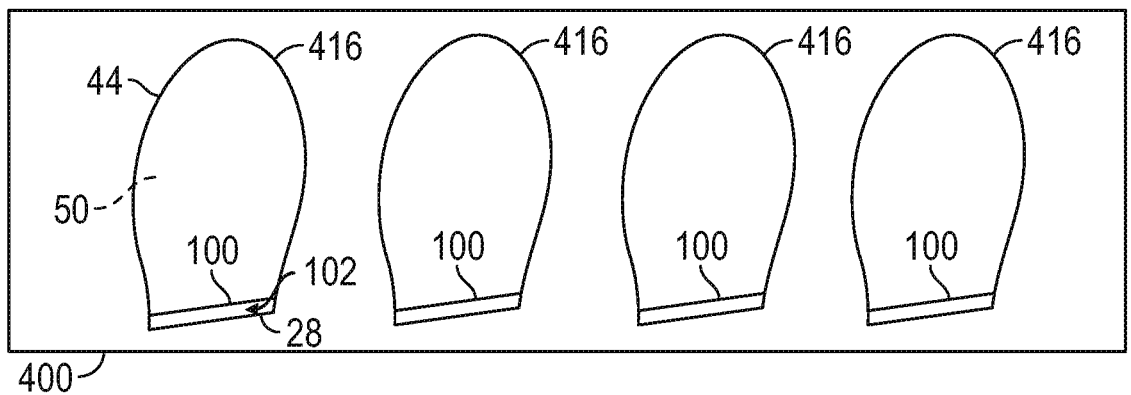
FIG. 14
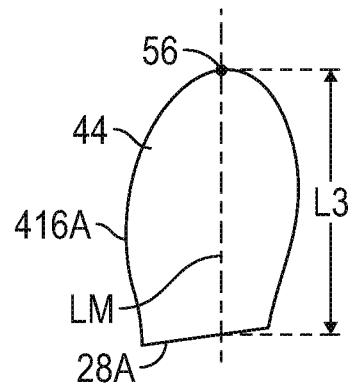   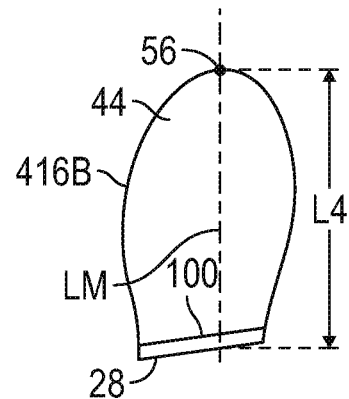
FIG. 15    FIG. 16
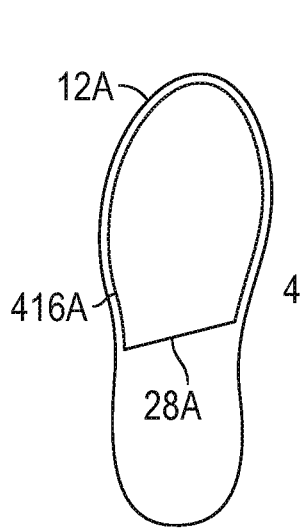 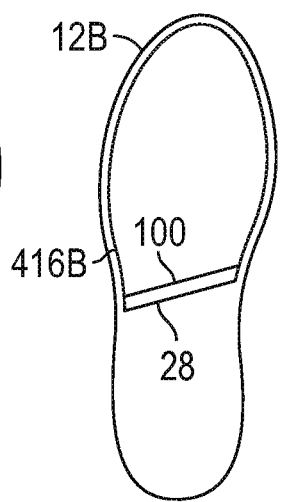 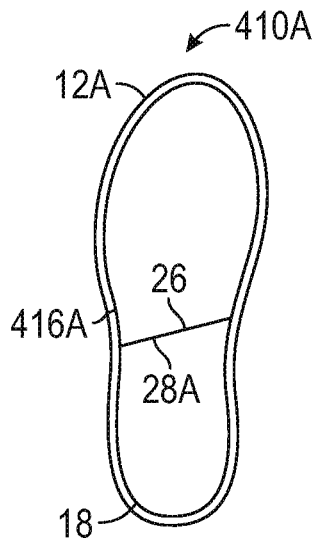 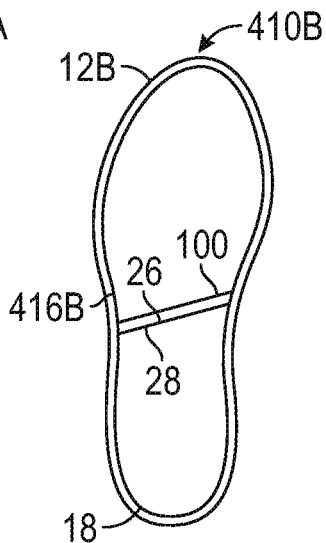
FIG. 17    FIG. 18    FIG. 19    FIG. 20

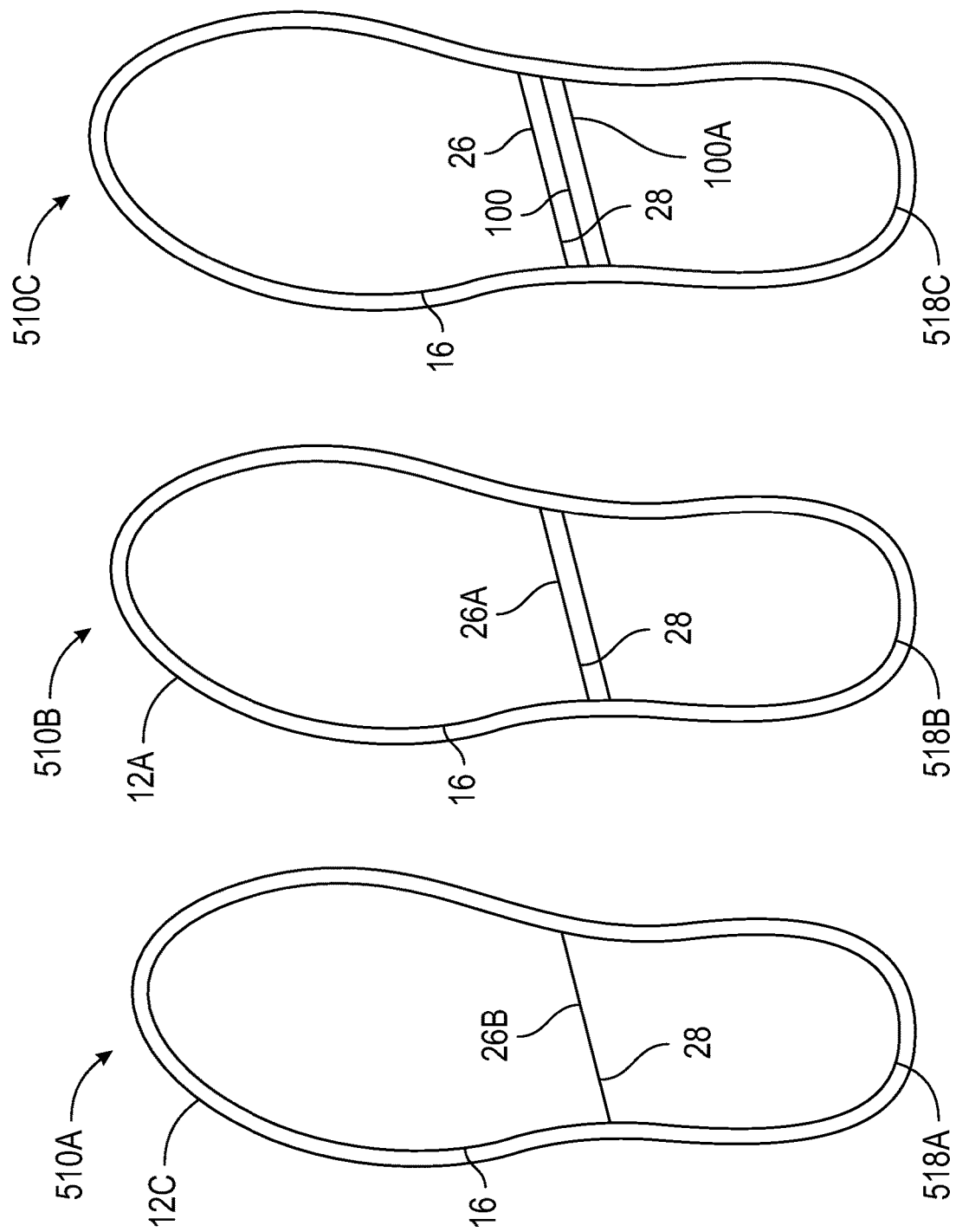

ARTICLE OF FOOTWEAR AND METHOD OF MANUFACTURING AN ARTICLE OF FOOTWEAR

CROSS-REFERENCE TO RELATED APPLICATION

This application is a continuation of U.S. patent application Ser. No. 15/457,375, filed Mar. 13, 2017, which claims the benefit of priority to U.S. Provisional Application No. 62/308,283 filed Mar. 15, 2016, and both of which are hereby incorporated by reference in their entirety.

TECHNICAL FIELD

The present teachings generally include an article of footwear and a method of manufacturing an article of footwear.

BACKGROUND

To ensure a proper fit, footwear is typically offered in a range of sizes with relatively small increments between sizes. The footwear typically includes an upper, and a sole structure underlying the upper. Both the sole structure and the upper are manufactured according to a specific size. The need for separate tooling for each size increases production costs. The logistics and floor space required for producing and stocking different sizes of these subcomponents of the article of footwear can increase production costs.

BRIEF DESCRIPTION OF THE DRAWINGS

FIG. 14 is a schematic illustration of an inventory of forefoot sole structures in accordance with an alternative aspect of the present teachings.

FIG. 15 is a schematic illustration of a first forefoot sole structure selected from the inventory of FIG. 14 after trimming at a groove.

FIG. 16 is a schematic illustration of a second forefoot sole structure selected from the inventory of FIG. 14.

FIG. 17 is a schematic illustration of the first forefoot sole structure of FIG. 15 attached to a first footwear upper.

FIG. 18 is a schematic illustration of the second forefoot sole structure of FIG. 16 attached to a second footwear upper.

FIG. 19 is a schematic illustration of an article of footwear with the forefoot sole structure and upper of FIG. 17, and with a heel sole structure attached to the upper.

FIG. 20 is a schematic illustration of an article of footwear of a different size with the forefoot sole structure and upper of FIG. 18 and with a heel sole structure attached to the upper.

FIG. 28 is a schematic illustration of an article of footwear with the heel sole structure and upper of FIG. 25 and with a forefoot sole structure attached to the upper.

FIG. 29 is a schematic illustration of an article of footwear of a different size with the heel sole structure and upper of FIG. 26, and with a forefoot sole structure attached to the upper.

FIG. 30 is a schematic illustration of another article of footwear of a different size with the heel sole structure and upper of FIG. 27, and with a forefoot sole structure attached to the upper.

DESCRIPTION

Figure 1:
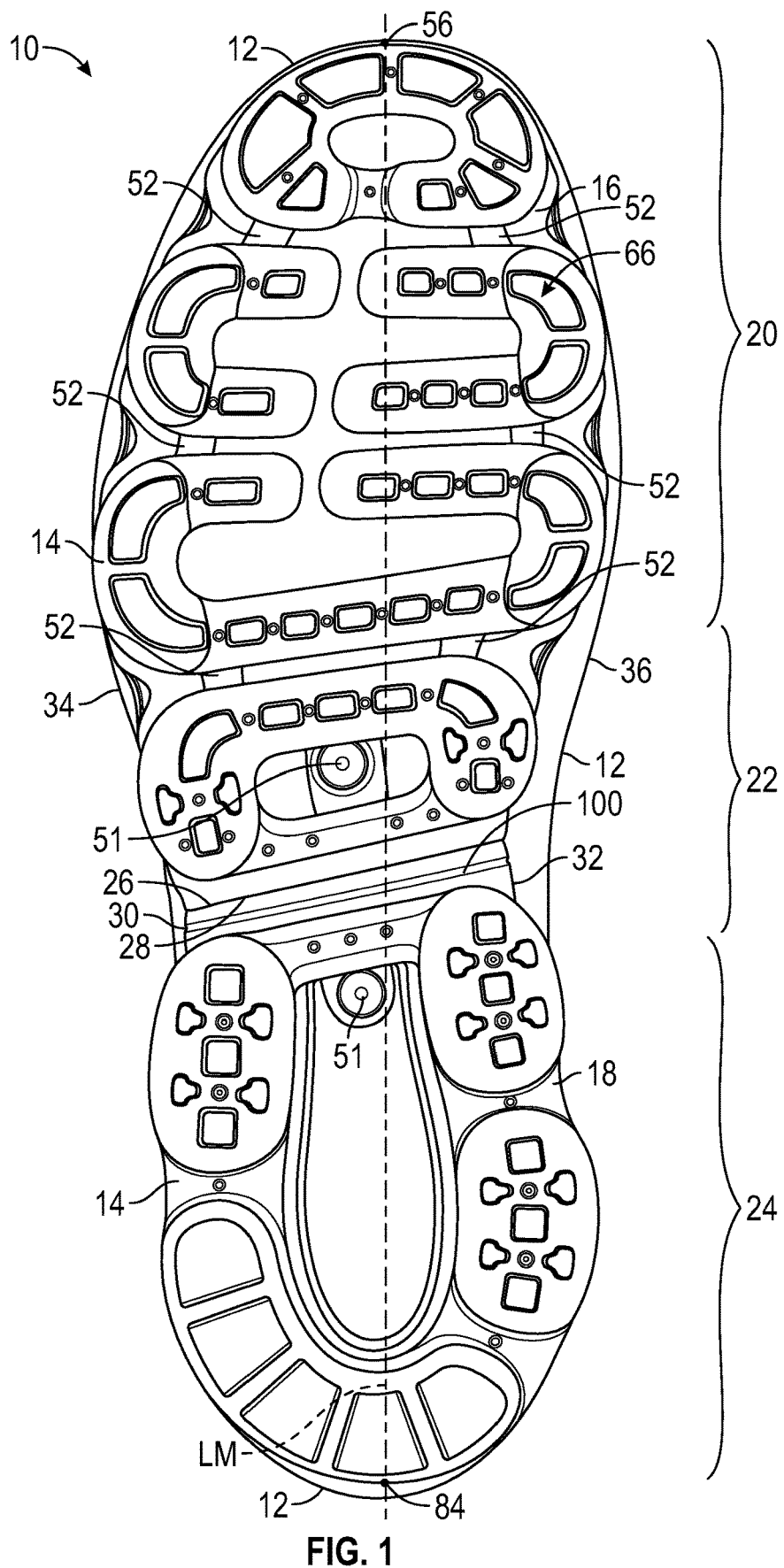
FIG. 1 is a schematic illustration in bottom view of a first embodiment of an article of footwear.

An article of footwear comprises a sole structure that is configured to be used in the manufacturing of multiple different sizes, increasing manufacturing flexibility and reducing manufacturing costs. The sole structure includes a polymeric bladder element enclosing a fluid-filled interior cavity. The bladder element has a peripheral flange that surrounds the fluid-filled interior cavity. The peripheral flange has a transverse edge extending from the lateral side of the bladder element to the medial side of the bladder element. Optionally, the transverse edge may be further forward at the medial side than at the lateral side.

The bladder element has a surface with a groove that extends generally parallel with the transverse edge from the lateral side to the medial side, and the bladder element has a reduced thickness at the groove. The bladder element has a first length along a longitudinal midline of the bladder element from a longitudinal extremity of the bladder element to the groove. The bladder element has a longer second length along the longitudinal midline of the bladder element from the longitudinal extremity to the transverse edge. The first length corresponds with a first footwear size, and the second length corresponds with a second footwear size larger than the first footwear size.

Accordingly, by trimming along the groove, the sole structure may be used in the production of articles of footwear of a first size, or may be used in the production of articles of footwear of a larger second size if not trimmed at the groove. The groove is configured to easily and accurately enable the sole structure to be adapted for use with the smaller footwear size when trimmed along the groove. Grading of sole structures with fluid-filled interior cavities, such as with a bladder element, presents unique challenges because the integrity of the sealed fluid-filled interior cavity cannot be compromised. As used herein, "grading" an article of footwear or a method of "grading" footwear refers to the method by which different sizes of footwear are manufactured. The groove is positioned such that it does not interfere with or limit the often complex contoured shape of the fluid-filled cavity in a bladder element.

In one or more embodiments, the sole structure is secured to a footwear upper with the transverse edge disposed at a midfoot region of the footwear upper. The variation in length by trimming at the groove thus affects the shape of the sole structure only at the midfoot region, which has relatively small changes in width. This placement of the groove advantageously avoids shape changes at the forefoot and heel regions, which have more drastic changes in curvature over relatively small length differentials.

In one or more embodiments, the sole structure is a heel sole structure, and the article of footwear further includes a footwear upper, and a forefoot sole structure secured to the footwear upper. In such an embodiment, the heel sole structure may be secured to the footwear upper with the transverse edge abutting a rear edge of the forefoot sole structure, and with the transverse edge and the rear edge both disposed at the midfoot region of the footwear upper.

In one or more embodiments, the sole structure is a forefoot sole structure, and the article of footwear further includes a footwear upper, and a heel sole structure secured to the footwear upper. In such an embodiment, the forefoot sole structure may be secured to the footwear upper with the transverse edge abutting a forward edge of the heel sole structure, and with the transverse edge and the forward edge both disposed at the midfoot region of the footwear upper.

The bladder element may include a first polymeric sheet, and a second polymeric sheet bonded to the first polymeric sheet at the peripheral flange. The first and the second polymeric sheets may be at least partially thermoplastic polyurethane (TPU). The method may include placing polymeric material, such as the first and second polymeric sheets, in a mold cavity of a mold of the bladder element. The mold has a mold surface with a protrusion. The method includes conforming the polymeric material to the mold surface, with the protrusion forming the groove in the polymeric material. This may include heating the polymeric sheets, and applying a vacuum to the polymeric sheets, and thermally bonding the sheets to one another at the peripheral flange. The bladder element may then be inflated to fill the interior cavity with a fluid such as a gas.

In one or more embodiments, the sole structure may have multiple grooves that enable use of the sole structure is the production of more than two different sizes of footwear. For example, the surface of the bladder element may have a second groove extending generally parallel with the first groove from the lateral side to the medial side. In such an embodiment, the bladder element has a third length along the longitudinal midline of the bladder element from the longitudinal extremity to the second groove, and the third length corresponds with a third footwear size smaller than the first footwear size.

In one or more embodiments, the article of footwear includes an outsole that is secured to the bladder element below the fluid-filled interior cavity and that has a ground-engaging surface. The peripheral flange of the bladder element is secured to a footwear upper such that the fluid-filled interior cavity extends below peripheral flange. The surface with the groove is a ground-facing surface of the bladder element that is displaced from a ground-engaging surface of sole structure by the fluid-filled interior cavity. Because the groove is not part of the ground-engaging surface, it does not affect traction whether or not the bladder element is trimmed at the groove. Additionally, because the groove is at the peripheral flange in the midfoot region, it does not affect the cushioning response of the sole structure.

A sole structure as described enables a method of manufacturing an article of footwear that includes selecting a first sole structure from an inventory of substantially identical sole structures. Each of the substantially identical sole structures includes a polymeric bladder element enclosing a fluid-filled interior cavity. The polymeric bladder element has a peripheral flange that surrounds the fluid-filled interior cavity and includes a transverse edge extending from the lateral side of the bladder element to the medial side of the bladder element. The bladder element also has a surface with a groove that extends generally parallel with the transverse edge from the lateral side to the medial side, and has a reduced thickness at the groove.

After the sole structure is selected, the method includes trimming the first sole structure along the groove, and attaching the trimmed first sole structure to a first footwear upper. The method includes selecting a second sole structure from the inventory, and attaching the second sole structure to a second footwear upper without trimming along the groove. The first footwear upper and the first sole structure correspond with a first footwear size, and the second footwear upper and the second sole structure correspond with a second footwear size larger than the first footwear size. For example, the second footwear size may be one-half size larger than the first footwear size on a United States (US) footwear size scale. The same inventory of identical sole structures is thus used to manufacture two different sizes of articles of footwear.

In one or more embodiments, the first sole structure is a first heel sole structure attached to a heel region of the first upper, and the bladder element of the first sole structure is a first heel bladder element. The second sole structure is a second heel sole structure attached to a heel region of the second upper, and the bladder element of the second sole structure is a second heel bladder element. The method further includes attaching a first forefoot sole structure to the first upper forward of the first heel sole structure, with a rear edge of the first forefoot sole structure adjacent the transverse edge of the first heel bladder element, and attaching a second forefoot sole structure to the second upper forward of the second heel sole structure, with the a rear edge of the second forefoot sole structure adjacent the transverse edge of the second heel bladder element.

In an embodiment with heel sole structures selected from an inventory of identical heel sole structures, optionally, the first forefoot sole structure and the second forefoot sole structure may also be selected from an inventory of substantially identical forefoot sole structures. Each forefoot sole structure in such an inventory includes a polymeric forefoot bladder element enclosing a fluid-filled interior cavity. The polymeric forefoot bladder element has a peripheral flange that surrounds the fluid-filled interior cavity of the forefoot bladder element and includes a transverse edge extending from the lateral side of the forefoot bladder element to the medial side of the forefoot bladder element. The fluid-filled interior cavity of the forefoot bladder element of the first forefoot sole structure is isolated from the fluid-filled interior cavity of the heel bladder element of the first heel sole structure, and the fluid-filled interior cavity of the forefoot bladder element of the second forefoot sole structure is isolated from the fluid-filled interior cavity of the heel bladder element of the second heel sole structure.

In one or more embodiments, the method may include abutting the rear edge of the first forefoot sole structure against the transverse edge of the first heel bladder element, and abutting the rear edge of the second forefoot sole structure against the transverse edge of the second heel bladder element when the forefoot sole structures and the heel sole structures are secured to the first and second uppers. Alternatively, a gap having a width within a predetermined manufacturing tolerance may exist between the transverse edge and the rear edge on each upper.

In one or more embodiments, the first sole structure is a first forefoot sole structure attached to a forefoot region of the first upper, the bladder element of the first sole structure is a first forefoot bladder element, the second sole structure is a second forefoot sole structure attached to a forefoot region of the second upper, and the bladder element of the second sole structure is a second forefoot bladder element. The method includes attaching a first heel sole structure to the first upper rearward of the first forefoot sole structure, with a forward edge of the first heel sole structure adjacent the transverse edge of the first forefoot bladder element, and attaching a second heel sole structure to the second upper rearward of the second forefoot sole structure, with the forward edge of the second heel sole structure adjacent the transverse edge of the second forefoot bladder element.

In one or more embodiments, the first sole structure is a first forefoot sole structure attached to a forefoot region of the first upper, and the second sole structure is a second forefoot sole structure attached to a forefoot region of the second upper. The method further includes attaching a first heel sole structure to the first upper rearward of the first forefoot sole structure, with a rear edge of the first forefoot sole structure adjacent a forward edge of the first heel sole structure, and attaching a second heel sole structure substantially identical to the first heel sole structure to the second upper rearward of the second forefoot sole structure, with a rear edge of the second forefoot sole structure adjacent a forward edge of the second heel sole structure; wherein the first heel sole structure and the second heel sole structure are substantially identical.

In one or more embodiments, the surface of the polymeric bladder element may also have a second groove that extends from the lateral side to the medial side and is generally parallel with the first groove and the transverse edge. In such an embodiment, the method may further include selecting a third sole structure from the inventory of sole structures, trimming along the second groove of the third sole structure, and attaching the third sole structure to a third footwear upper. The third forefoot upper and the third sole structure correspond to a third footwear size smaller than the first footwear size in such an embodiment.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Figure 2:
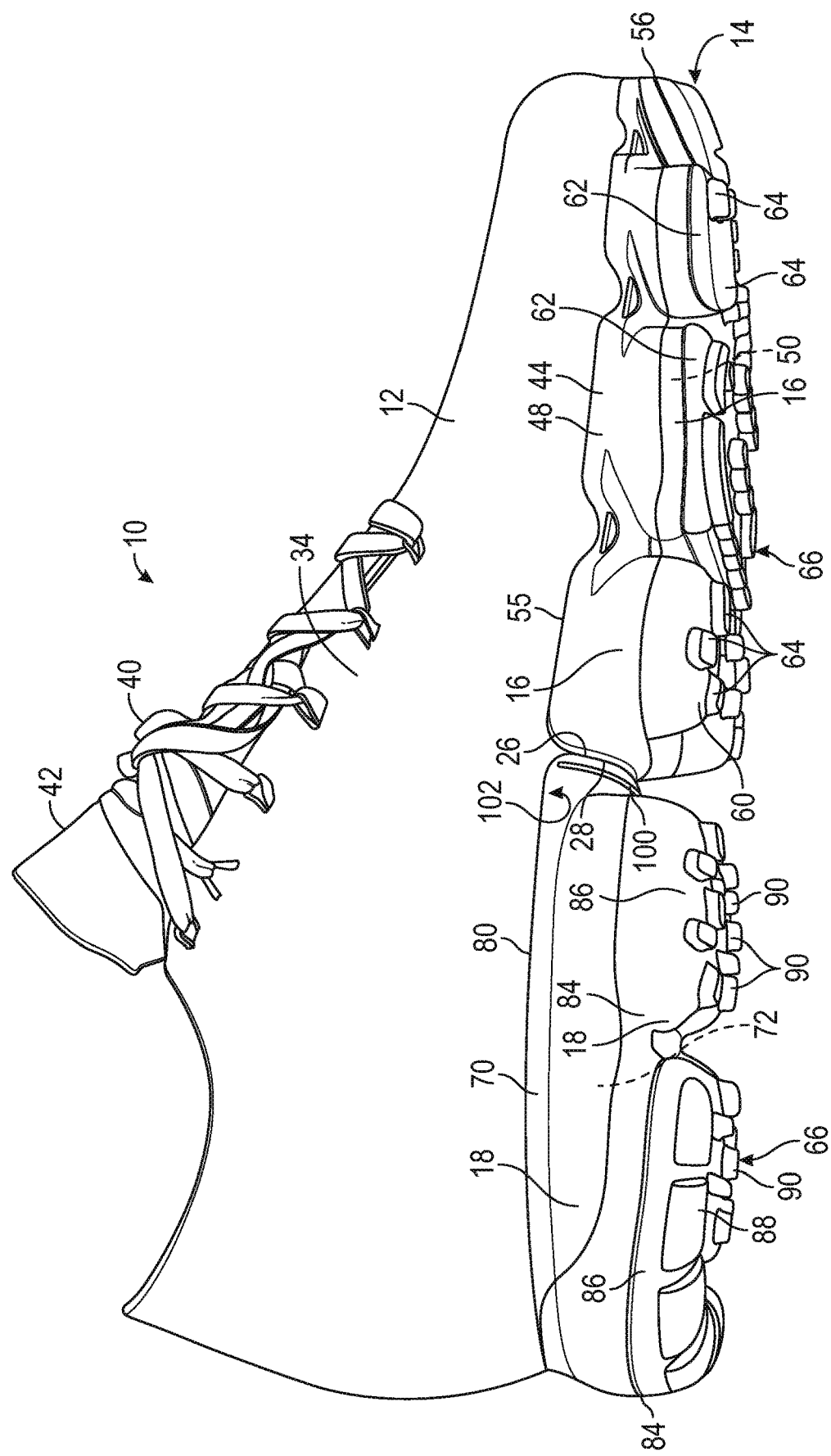
FIG. 2 is a schematic illustration in lateral side view of the article of footwear of FIG. 1.

Referring to the drawings, wherein like reference numbers refer to like components throughout the views, FIGS. 1 and 2 show an article of footwear 10 with an upper 12 and a sole structure 14. As further discussed herein, the sole structure 14 is manufactured according to a method that provides one or more strategically placed grooves in the sole structure 14, enabling the sole structure 14 to be used in manufacturing an article of footwear of a first size by trimming the sole structure 14 along the groove, or for an article of footwear of a larger second size when the sole structure 14 is not trimmed along the groove.

Figure 3:
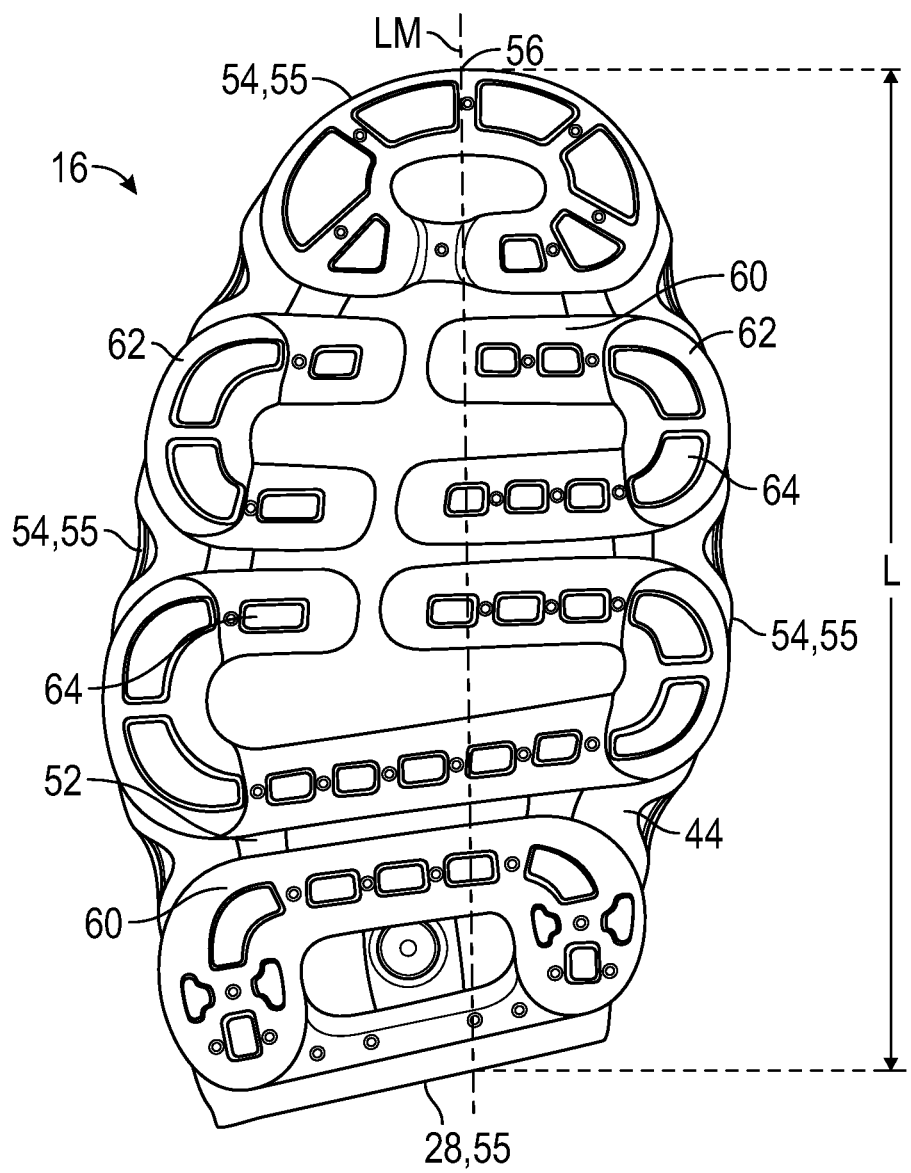
FIG. 3 is a schematic illustration in bottom view of a forefoot sole structure of the article of footwear of FIG. 1.
Figure 4:
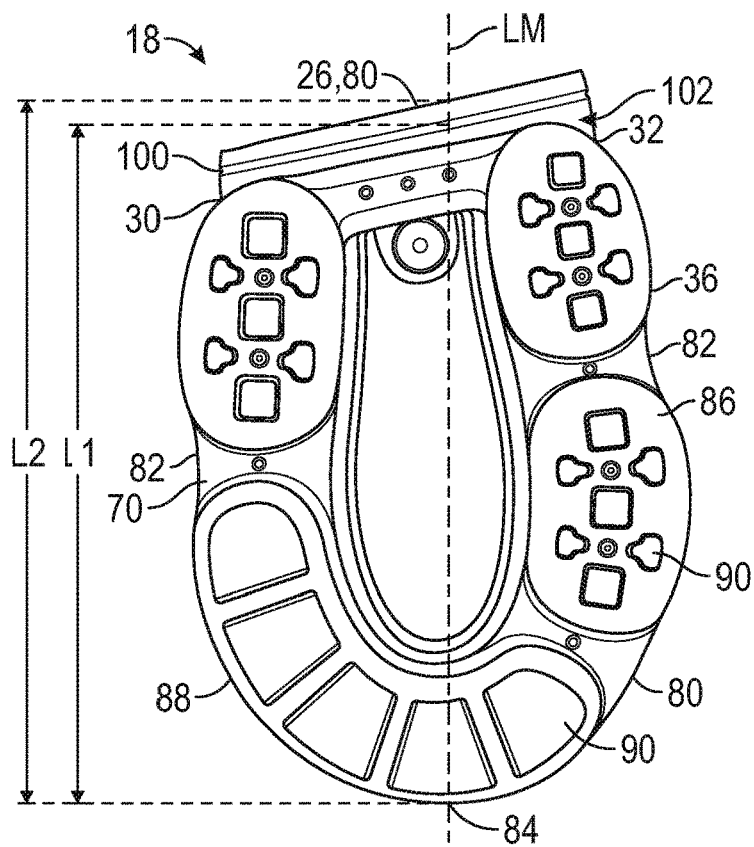
FIG. 4 is a schematic illustration in bottom view of a heel sole structure of the article of footwear of FIG. 1.

The sole structure 14 includes a forward sole structure, referred to herein as a forefoot sole structure 16, and a rearward sole structure, referred to herein as a heel sole structure 18. The forefoot sole structure 16 and the heel sole structure 18 are each unitary, one-piece sole structures and are not connected to or in fluid communication with one another. FIG. 3 shows the forefoot sole structure 16 before attachment to the upper 12. FIG. 4 shows the heel sole structure 18 before attachment to the upper 12. The heel sole structure 18 is secured to the footwear upper 12 with a forward edge, also referred to as a transverse edge 26, disposed in the midfoot region 22. The forefoot sole structure 16 is disposed with a transverse edge that is a rear edge 28 disposed in the midfoot region 22 and generally parallel with the transverse edge 26. The transverse edge 26 and the rear edge 28 are both generally straight and extend from the lateral side 30 to the medial side 32 of the sole structure 14. The edges 26, 28 are further forward on the medial side 32 of the article of footwear 10 than on the lateral side 30. In an embodiment, the transverse edge 26 can be disposed so that it abuts the rear edge 28 from the lateral side 30 to the medial side 32. Alternatively, a small gap of a width within a predetermined range of widths consistent with a predetermined manufacturing tolerance may exist between the edges 26, 28 when they are secured to the upper 12. The forefoot sole structure 16 and the heel sole structure 18 together extend over an entire forefoot region 20, a midfoot region 22, and a heel region 24 of the article of footwear 10.

The forefoot region 20 generally includes portions of the article of footwear 10 corresponding with the toes and the joints connecting the metatarsals with the phalanges of the human foot. The midfoot region 22 generally includes portions of the article of footwear 10 corresponding with an arch area of the human foot, including the navicular joint. The heel region 24 generally includes portions of the article of footwear 10 corresponding with rear portions of a human foot, including the calcaneus bone, when the human foot is supported on the sole structure 14 and is a size corresponding with the sole structure 14.

As used herein, a lateral side of a component for an article of footwear, including a lateral side 30 of the sole structure 14, is a side that corresponds with an outside area of the human foot (i.e., the side closer to the fifth toe of the wearer). The fifth toe is commonly referred to as the little toe. A medial side 32 of a component for an article of footwear, including a medial side 32 of the sole structure 14, is the side that corresponds with an inside area of the human foot (i.e., the side closer to the hallux of the foot of the wearer). The hallux is commonly referred to as the big toe. A lateral side 34 of the upper 12 and a medial side 36 of the upper 12 are also indicated.

The term "longitudinal," as used herein, refers to a direction extending along a length of the article of footwear 10, i.e., extending from the forefoot region 20 to the heel region 24. The term "forward" is used to refer to the general direction from the heel region 24 toward the forefoot region 20, and the term "rearward" is used to refer to the opposite direction, i.e., the direction from the forefoot region 20 toward the heel region 24.

Referring to FIG. 2, the footwear upper 12 provides a secure covering for a foot of a wearer. As such, the foot may be located within upper 12 to effectively secure the foot to the article of footwear 10. The sole structure 14 is secured to a lower area of upper 12 and extends between the foot and the ground to support the foot, attenuate ground reaction forces (i.e., cushion the foot), provide traction, enhance stability, and influence the motions of the foot, for example.

The upper 12 may incorporate various materials and defines a cavity in which the foot can be placed so that the upper 12 extends along a lateral side of the foot, along a medial side of the foot, over the foot, and around the heel. Optionally, the upper 12 can extend under the foot, or alternatively, a lower periphery of the upper 12 can be secured to a strobel that extends under the foot. A lace 40 and a tongue 42 may be utilized to modify the dimensions of the interior void, thereby securing the foot within the interior void and facilitating entry and removal of the foot from the interior void.

Figure 5:
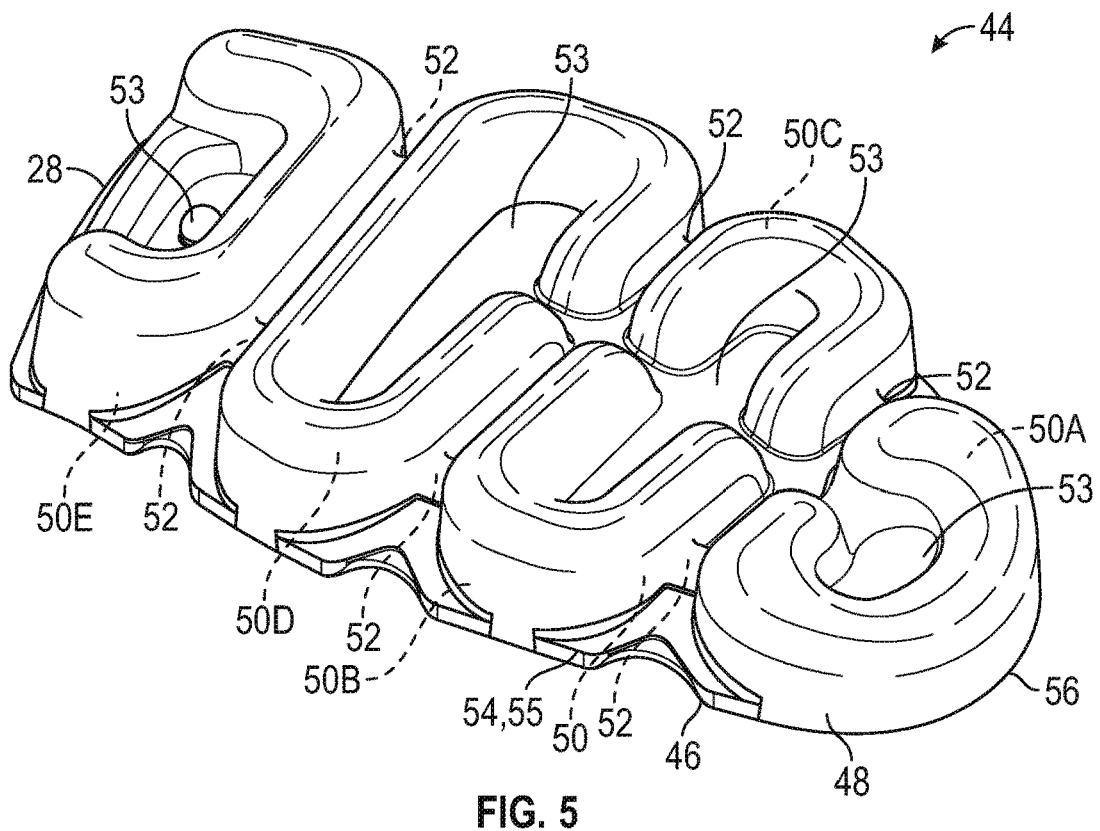
FIG. 5 is a schematic perspective illustration showing a bladder element of the forefoot sole structure of FIG. 3.

The sole structures 16, 18 both include polymeric bladder elements. FIGS. 2 and 5 show a forefoot bladder element 44 of the forefoot sole structure 16. The bladder element 44 is thermoformed from an upper polymeric sheet 46 and a lower polymeric sheet 48 (see FIG. 31) to enclose an interior cavity 50. The interior cavity 50 is inflated through an inflation port 51 (shown in FIG. 15) to fill the cavity 50 with fluid, such as air or nitrogen. The inflation port 51 is then sealed. As best shown in FIG. 5, the interior cavity 50 is subdivided into sub cavities 50A, 50B, 50C, 50D, and 50E, in fluid communication with one another through channels 52. Between the sub cavities, the sheets 46, 48 are bonded to one another, such as by thermal bonding during thermoforming, creating web regions 53 of the bladder element 44. Around the periphery of the interior cavity 50, the sheets 46, 48 are bonded to one another at a peripheral flange 54 that surrounds the fluid-filled interior cavity 50. As best shown in FIG. 3, the peripheral flange 54 includes a contoured edge 55 that extends from the lateral side 30, around a forward longitudinal extremity 56, to the medial side 32, and also includes the transverse edge 28.

The bladder elements 44, 70 may each be thermoformed from upper and lower sheets 46, 48 as shown and described herein (also referred to as first and second sheets, first and second layers, or upper and lower layers), or, in the alternative, may be blow-molded from a pre-form polymeric material. The sheets may have alternating layers of thermoplastic urethane (TPU) and a gas barrier material. In any embodiment, each bladder element 44, 70 is configured to retain fluid within the fluid-filled interior cavities 50, 72. As used herein, a "fluid" includes a gas, including air, an inert gas such as nitrogen, or another gas. Accordingly, "fluid-filled" includes "gas-filled". The various materials used for the bladder elements 44, 70 may be substantially transparent or may have a tinted color. For example, the bladder elements 44, 70 can be formed from any of various polymeric materials that retain a fluid at a predetermined pressure, including a fluid that is a gas, such as air, nitrogen, or another gas. For example, the bladder elements 44, 70 can be a TPU material, a urethane, polyurethane, polyester, polyester polyurethane, and/or polyether polyurethane.

Moreover, in one embodiment, the bladder elements 44, 70 can be formed from one or more sheets having layers of different materials. The sheets may be laminate membranes formed from thin films having one or more first layers that comprise thermoplastic polyurethane layers and that alternate with one or more second layers, also referred to herein as barrier layers, gas barrier polymers, or gas barrier layers. The second layers may comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The first layer may be arranged to form an outer surface of the polymeric sheet. That is, the outermost first layer may be the outer surface of the bladder element 44 or 70. The bladder elements 44, 70 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. Each sheet 46, 48 may also be a flexible microlayer membrane that includes alternating layers of a gas barrier polymer material such as second layers and an elastomeric material such as first layers, as disclosed in U.S. Pat. Nos. 6,082,025 and 6,127,026 to Bonk et al. which are incorporated by reference in their entireties. Additional suitable materials for the bladder elements 44, 70 are disclosed in U.S. Pat. Nos. 4,183,156 and 4,219,945 to Rudy which are incorporated by reference in their entireties. Further suitable materials for the bladder elements 44, 70 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder elements 44, 70, engineering properties such as tensile strength, stretch properties, fatigue characteristics, dynamic modulus, and loss tangent can be considered. When the bladder elements 44, 70 are formed from sheets, the thicknesses of the sheets used to form the bladder elements 44, 70 can be selected to provide these characteristics.

Various outsole components 60, 62 can be secured to a lower surface of the bladder element 44 as shown in FIG. 3. The bladder element 44 is shown without the outsole components 60, 62 in FIG. 5. The outsole components 60, 62 can have tread elements 64 that provide a ground-engaging surface 66. Only some of the outsole components 60, 62 and tread elements 64 are indicated with reference numbers in FIG. 3 for clarity in the drawings.

Figure 6:
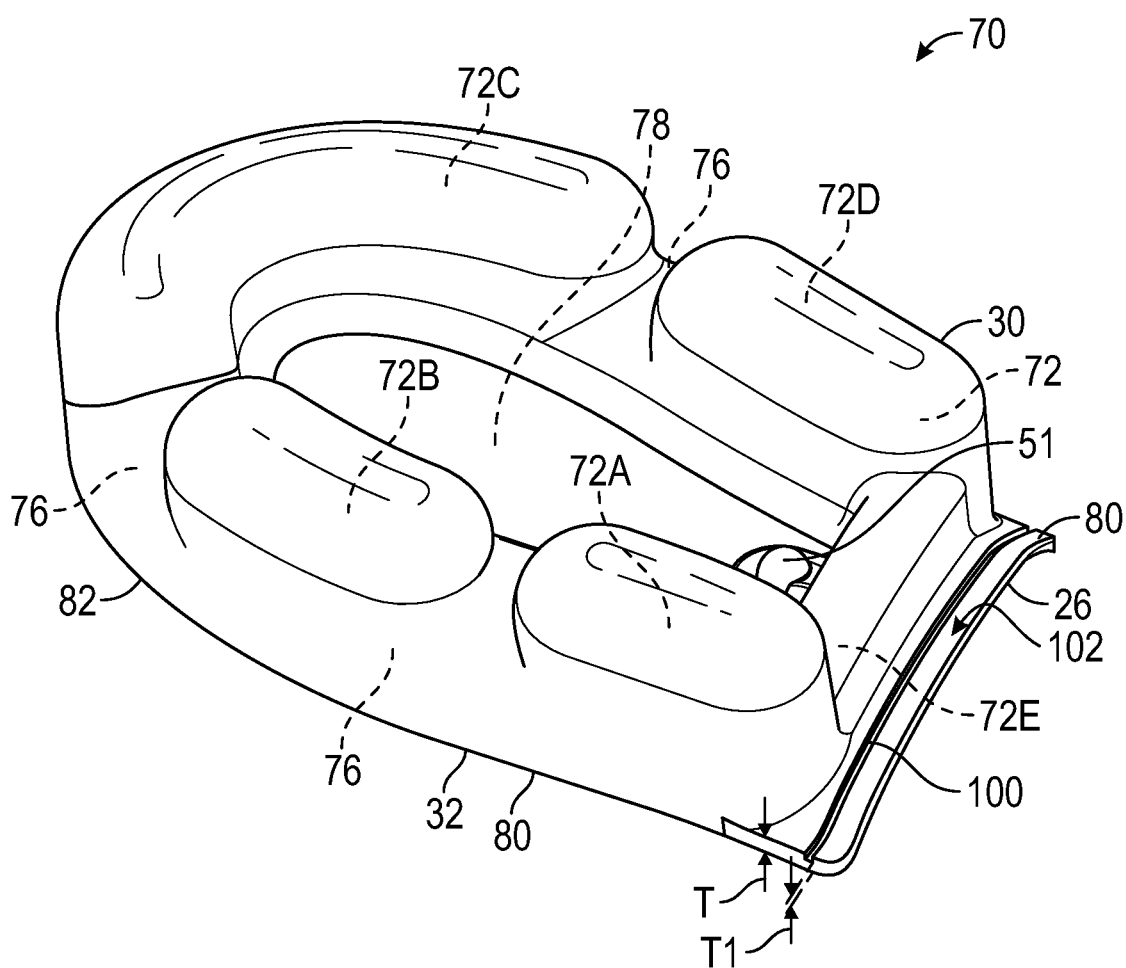
FIG. 6 is a schematic perspective illustration showing a bladder element of the heel sole structure of FIG. 4.
Figure 31:
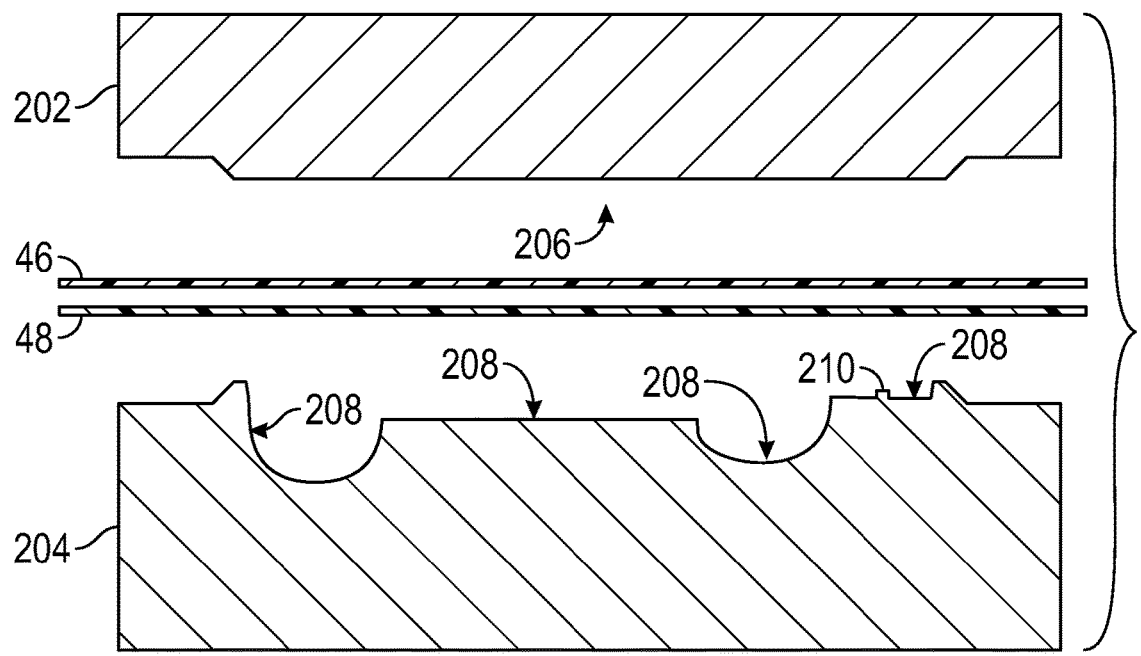
FIG. 31 is a schematic illustration in exploded view of a thermoforming mold in an open state and polymeric sheets.
Figure 32:
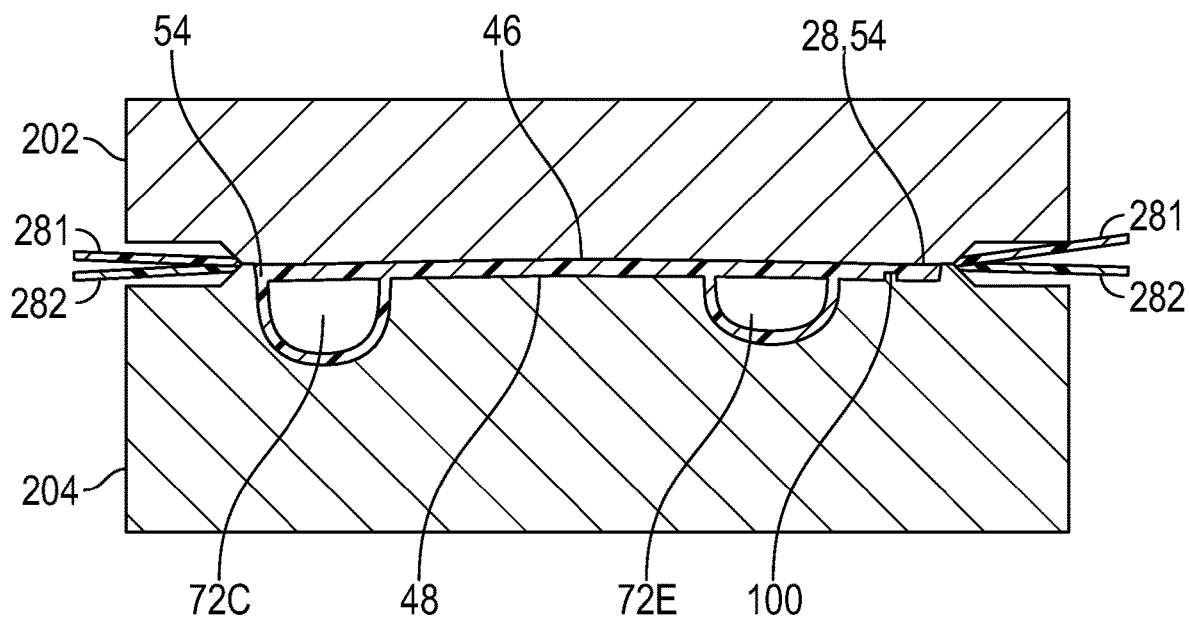
FIG. 32 is a schematic illustration of the thermoforming mold of FIG. 31 in a closed state and with the polymeric sheets conformed to the mold surfaces.

FIG. 2 shows the heel sole structure 18 includes bladder element 70 thermoformed from an upper polymeric sheet 46 (as shown in FIGS. 31 and 32) and a lower polymeric sheet 48 to enclose an interior cavity 72. The upper and lower polymeric sheets 46, 48 may be the same sheets as used to form the bladder element 44, if the mold includes mold cavities for both of the bladder elements 44, 70. Alternatively, different upper and lower polymeric sheets 46, 48 can be used for the bladder element 70. The cavity 72 is inflated through an inflation port 51 to fill the cavity 72 with fluid, such as air or nitrogen. The inflation port 51 is then sealed. The interior cavity 72 is subdivided into sub cavities 72A, 72B, 72C, 72D, and 72E in fluid communication with one another through a channel 76, as shown in FIG. 6. Between the sub cavities, the sheets 46, 48 are bonded to one another, such as by thermal bonding during thermoforming, creating a web region 78 of the bladder element 44. Around the periphery of the interior cavity 72, the sheets 46, 48 are bonded to one another at a peripheral flange 80 that surrounds the fluid-filled interior cavity 72. As best shown in FIG. 4, the peripheral flange 80 includes a contoured edge 82 that extends from the lateral side 30, around a rear longitudinal extremity 84, to the medial side 32, and also includes the transverse edge 26. Various outsole components 86, 88 can be secured to a lower surface of the bladder element 70, which is also referred to as the ground-facing surface 102. The bladder element 70 is shown without the outsole components 86, 88 in FIG. 6. The outsole components 86, 88 have tread elements 90 that provide part of the ground-engaging surface 66 indicated in FIG. 2. Only some of the outsole components 86, 88 and tread elements 90 are indicated with reference numbers in FIG. 4 for clarity in the drawings.

For proper support of the foot, the overall length of the sole structure 14 from the forward longitudinal extremity 56 to the rear longitudinal extremity 84 should correspond to a particular footwear size. The selection of the length and of the width at various locations for each footwear size is part of grading of the article of footwear. Grading of footwear often requires separate tooling for each size of footwear, as the length and width of the sole structure is scaled for each size. If the sole structure 14 were a unitary, full-length bladder element extending from the forward extremity 56 to the rear extremity 84, tooling would be required for each footwear size in order for a different length from the forward extremity 56 to the rearward extremity 84 to be provided for each footwear size.

To overcome this requirement, the sole structure 14 has two separate bladder elements 44, 70 that are not in fluid communication with one another (i.e., isolated from one another). At least one of the bladder elements of the sole structure 14 is configured to be easily and accurately altered in length after the bladder element 44 and/or 70 is thermoformed. The sole structure 14 is manufactured so that a combined length of the forefoot sole structure 16 and the heel sole structure 18 can be easily and accurately be varied to correspond with a different footwear size after the footwear sole structure 16 and the heel sole structure 18 are completely formed and prior to attachment to a selected footwear upper. Accordingly, a single, common thermoforming mold can be used to make bladder elements that are ultimately used in footwear of different sizes.

More specifically, either or both of the bladder elements 44, 70 are formed or otherwise provided with at least one groove 100 extending from the lateral side 30 to the medial side 32 after the bladder element 44, 70 is thermoformed. FIGS. 2 and 6 show a groove 100 in a lower surface 102 of the bladder element 70. The portion of the bladder element 44 or 70 with the groove 100 is disposed in the midfoot region 22 of the sole structure 14 when the bladder element 70 is secured to the upper 12, as best shown with respect to bladder element 70 in FIG. 1. The groove 100 extends generally parallel with the transverse edge 26 from the lateral side 30 to the medial side 32.

As is evident in FIG. 1, the width of the sole structure 14 is relatively constant in the portion of the midfoot region 22 at which the groove 100 is situated in comparison to the changes in width that occur at the forward most portion of the forefoot region 20, near the forward extremity 56, and at the rearward most portion of the heel region 24, near the rear extremity 84. A shortening of the bladder element 44 near the forward extremity 56, such as by several millimeters, with no other changes in the width (i.e., no grading of the width), would significantly affect the curvature from the lateral side 30 to the medial side 32 at the forward extremity 56. The curvature from the lateral side 30 to the medial side 32 at the rear extremity 84 would likewise be significantly altered if the bladder element 70 was shortened at the rear extremity 84 by several millimeters.

By providing the length adjustment feature (i.e., the groove 100) at a transverse edge 26 of the bladder element 44 and/or 70 in the midfoot region 22, grading of width of the bladder element between at least some consecutive foot sizes can be avoided. Instead, the length of the formed bladder element 44 and/or 70 can be altered so that bladder elements from the same thermoforming mold can be adapted for use in articles of footwear of different sizes.

With reference to FIG. 4, the bladder element 70 has a first length L1 along a longitudinal midline LM of the bladder element 70 from the longitudinal end of the peripheral flange 80 (i.e., the end at the extremity 84) to the middle of the groove 100. The longitudinal midline LM of the bladder element 70 is considered to be the longitudinal midline LM of the sole structure 14 when the bladder elements 44, 70 are secured to the upper 12, as indicated in FIG. 1, and extends through the forward longitudinal extremity 56 and the rear longitudinal extremity 84. The bladder element 18 has a second length L2 along the longitudinal midline LM from the rear longitudinal extremity 84 to the transverse edge 26. As is evident in FIG. 4, the first length L1 is less than the second length L2. In one non-limiting example, the difference in lengths L1 and L2 due to trimming at the groove 100, may be approximately 4 millimeters. The bladder element 70 is configured so that the first length L1 corresponds with a first footwear size and the second length L2 corresponds with a second footwear size larger than the first footwear size when the sole structure 18 is secured to the upper 12. As shown in FIG. 3, the forefoot sole structure 16 has a length L from the forward longitudinal extremity 56 to the transverse edge 28 along the longitudinal midline LM. The sum of the length L of the forefoot sole structure 16 along the longitudinal midline LM and the first length L1, is the total length along the longitudinal midline LM of the sole structure 14, corresponds with an article of footwear of a first footwear size, such as a US (United States) size 8. The sum of the length L of the forefoot sole structure 16 and the length L2 may correspond with an article of footwear of a second footwear size larger than the first footwear size, such as a US size 8.5. The example sizes 8.0 and 8.5 and the half-size difference between the sizes are non-limiting. For example, the groove 100 may be sized so that the difference in length between L1 and L2 results in a greater size difference, or a lesser size difference than 0.5 on the US footwear size scale.

Figures 12, 13:
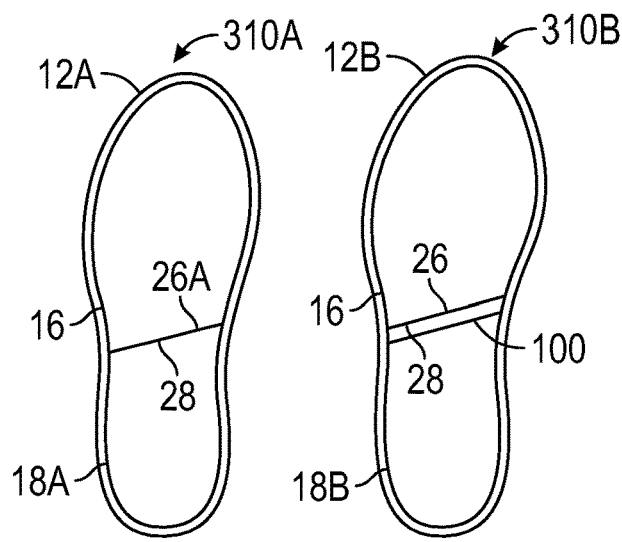
FIG. 12 is a schematic illustration of an article of footwear with the heel sole structure and upper of FIG. 10, and with a forefoot sole structure attached to the upper.
FIG. 13 is a schematic illustration of an article of footwear of a different size and with the heel sole structure and upper of FIG. 11, and with a forefoot sole structure attached to the upper.

The bladder element 70 has a reduced thickness Ti at the groove 100 in comparison to the thickness T of the flange 80, as shown in FIG. 6. The material of the bladder element 70 and the reduced thickness Ti of the bladder element 70 at the groove 100 enables the bladder element 70 to be easily trimmed along the center of the groove 100 from the lateral side 30 to the medial side 32 (or from the medial side 32 to the lateral side 30) resulting in a new transverse edge 26A shown in FIG. 8 with respect to first heel sole structure 18A. Trimming the bladder element 70 along the groove 100 in this manner results in a bladder element 70 with the shorter length L1. When the heel sole structure 18A is secured to the footwear upper 12 as shown in FIG. 12 with the new transverse edge 26A abutting the rear edge 28 of the forefoot sole structure 16 (or with a predetermined gap between the edges 26A, 28) the overall length from the forward longitudinal extremity 56 to the rear longitudinal extremity 84 is reduced by the difference between length L1 and length L2. With the new transverse edge 26A and the rear edge 28 disposed at the midfoot region 22, the contoured edge 82 and corresponding fit at the forefoot region 20, and the contoured edge 82 and corresponding fit at the rear of the heel region 24 are unchanged whether or not the bladder element 70 is trimmed at the groove 100.

As best shown in FIG. 2, the outsole components 60, 62 are secured to the bladder element 70 below the fluid filled interior cavity 50, and the separate outsole components 86, 88 are secured to the bladder element 70 below the fluid-filled interior cavity 72. The peripheral flanges 54, 80 are secured to the footwear upper 12, such as by thermal bonding, adhesive, sewing, or other method. The fluid-filled interior cavities 50, 72 extend below the respective peripheral flanges 54, 80, and the groove 100 is in the ground-facing surface 102 of the bladder element 70 near the transverse edge 26 of the peripheral flange 80. The groove 100 is displaced from the ground-engaging surface 66 of sole structure 14 at least by the fluid-filled interior cavity 72. As such, if the bladder element 70 is not trimmed at the groove 100 prior to securement to the upper 12, the groove 100 has no effect on traction as it is not at the ground-engaging surface 66.

Figure 21:
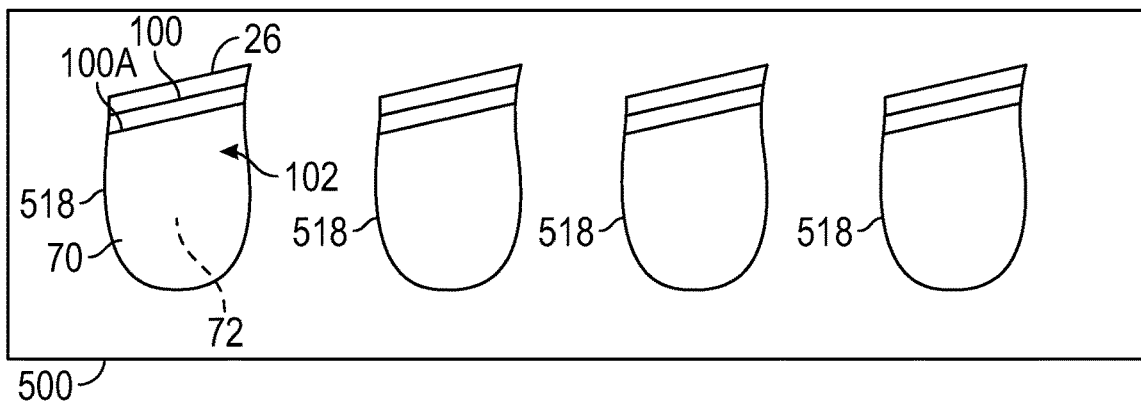
FIG. 21 is a schematic illustration of an inventory of heel sole structures in accordance with an alternative aspect of the present teachings.

In another embodiment, two grooves 100 can be provided in the ground-facing surface 102 forward of the interior cavity 72 and rearward of the transverse edge 26, each generally parallel with one another, as schematically shown in the bladder element 70 of the heel sole structure 518 of FIG. 21. In still another embodiment, one or more grooves 100 can be provided in the ground-facing surface 102 of the forefoot bladder element 44, rearward of the interior cavity 50 and forward of the rearward edge 28, as schematically shown in the bladder element 44 of the forefoot sole structure 416 of FIG. 14.

With reference to FIG. 31, the bladder elements 44, 70 can be formed from polymeric sheets 46, 48 in a thermoforming mold having an upper mold 202 and a lower mold 204. The mold 202, 204 is shown with mold surfaces 206, 208 for forming the bladder element 70. A person of ordinary skill in the art will readily understand how differently configured mold surfaces can be used to form the bladder element 44. A combined thermoforming and vacuum-forming (also referred to as vacuuforming) process, which includes applying a vacuum through vacuum ports (not shown) in the mold 202, 204 to conform a first portion of the polymeric material (i.e., the enclosed portion of the first sheet 46) to the first mold surface 206 of the upper mold 202, and conform a second portion of the polymeric material (i.e., the bottom surface of the enclosed portion of the second sheet 48) to the second mold surface 208 with the interior cavity 72 between the first portion and the second portion as shown in FIG. 32 by sub cavities 72C, 72E. Alternatively, pressurized fluid could be introduced between the sheets 46, 48 in the closed mold 202, 204 to force the sheets to conform to the mold surfaces 206, 208. The second mold surface 208 has a protrusion 210 against which the second polymeric sheet 48 is thermoformed. The protrusion 210 is shaped to result in the groove 100 in the lower sheet 48. Stated differently, the groove 100 can be thermoformed into the bladder element 70. Alternatively, the groove 100 could be provided by another method, such as by scoring or etching the groove into the surface 102 after the bladder element 70 is removed from the mold.

Optionally, the outsole component 86 can be a TPU material and can also be placed in the mold and thermoformed and thermally bonded to the lower sheet 48. The outsole components 88 can be rubber, and can be secured to the outsole component 86 with adhesive or otherwise after removal of the bladder element 70 from the mold 202, 204. The contact of the upper mold 202 and the lower mold 204 severs excess portions 281, 282 of the sheets 46, 48. The interior cavity 72 may be inflated after the thermoforming process is complete (i.e., after removal of the bladder element 70 and first outsole component 86 from the thermoforming mold 202, 204.

Figure 7:
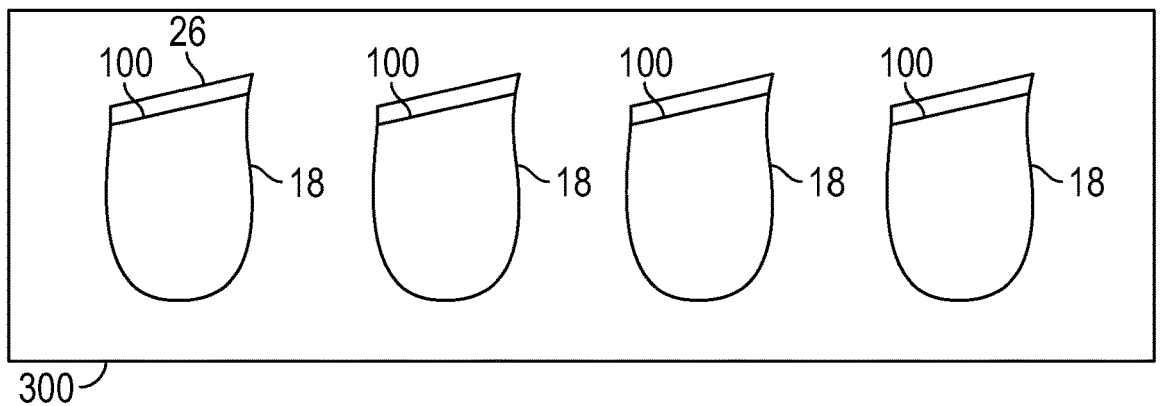
FIG. 7 is a schematic illustration of an inventory of heel sole structures of FIG. 4.

Providing one or more grooves 100 in either or both bladder elements 44 and 70 increases manufacturing flexibility and potentially reduces manufacturing costs through reduced tooling costs and economies of scale. For example, with reference to FIG. 7, a method of manufacturing an article of footwear may include providing an inventory 300 of substantially identical sole structures 18. The inventory 300 is depicted schematically as a rectangular boundary grouping the sole structures 18, and is meant only to denote that the substantially identical sole structures 18 may be stocked together after formation. The sole structures 18 are shown only schematically in FIG. 7, but each is configured as shown in FIG. 4.

Depending on production demands for specific footwear sizes, some of the substantially identical sole structures 18 in the inventory 300 can be used to make footwear of a first size, and some can be used to make footwear a different second size as described herein. Alternatively, all of the sole structures 18 may be used to make footwear of the first size, or all of the sole structures 18 may be used to make footwear of the second size.

Figure 8:
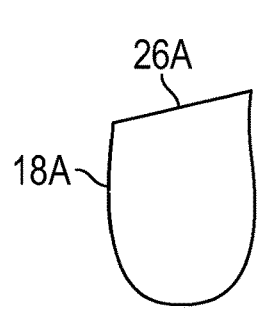
FIG. 8 is a schematic illustration of a first heel sole structure selected from the inventory of FIG. 7 after trimming at a groove.
Figures 10, 11:
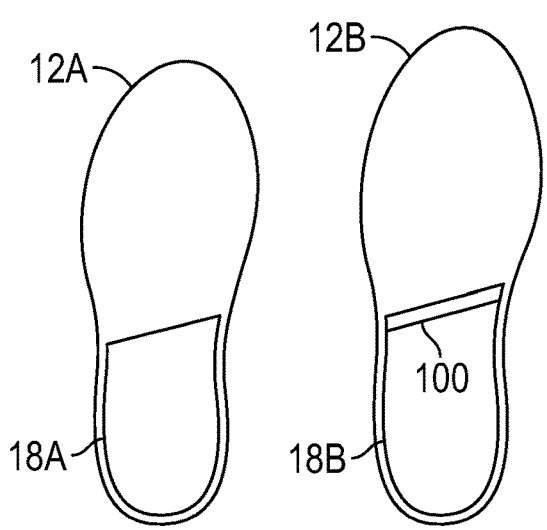
FIG. 10 is a schematic illustration of the first heel sole structure of FIG. 8 attached to a first footwear upper.
FIG. 11 is a schematic illustration of the second heel sole structure of FIG. 9 attached to a second footwear upper.

The method includes selecting a first sole structure 18 from the inventory 300, indicated as sole structure 18A in FIG. 8. If the smaller footwear size of the first footwear 310A is desired, the sole structure 18A is trimmed along the groove 100, resulting in a new transverse edge 26A slightly further rearward of the original transverse edge 26, as shown in FIG. 8. The first sole structure 18A is attached to a first footwear upper 12A as shown in FIG. 10. The first footwear upper 12A is substantially identical to the footwear upper 12 described with respect to FIGS. 1 and 2, and is a size that corresponds with the first footwear size. A first forefoot sole structure 16 such as shown in FIG. 3 is then secured to the first upper 12A forward of the first heel sole structure 18A with a rear edge 28 of the first forefoot sole structure 16 adjacent and optionally abutting the transverse edge 26A of the heel bladder element 70 of the first heel sole structure 18A as shown in FIG. 12, at least a portion of the edges 26A, 28 parallel with one another. These steps can be repeated to manufacture a desired number of articles of footwear 310A of the first size.

Figure 9:
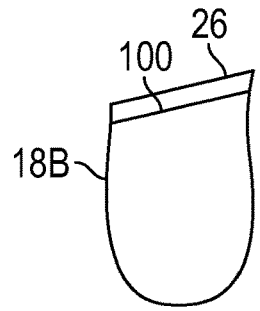
FIG. 9 is a schematic illustration of a second heel sole structure selected from the inventory of FIG. 7.

If one or more articles of footwear 310B of the second footwear size are desired, the same inventory 300 of sole structures 18 can be used. For example, a second heel sole structure indicated as sole structure 18B as shown in FIG. 9 can be selected from the inventory 300, and then attached to a second footwear upper 12 without trimming along the groove 100, as shown in FIG. 11. The second footwear upper 12B is substantially identical to footwear upper 12A and is sized to correspond to the second footwear size. A forefoot sole structure 16 is then secured to the upper 12B with the rearward edge 28 abutting the transverse edge 26 such that at least a portion of the edges 26, 28 are substantially parallel as shown in FIG. 13, resulting in the article of footwear 310B. Identical forefoot sole structures 16 are used in the article of footwear 310A and 310B. The article of footwear 310A of FIG. 12 is a first size while the article of footwear 310B of FIG. 13 is a larger second size.

For still further flexibility in manufacturing, an inventory 400 of substantially identical forefoot sole structures 416 can be provided as shown in FIG. 14. The forefoot sole structures 416 are identical to forefoot sole structures 16 except for the addition of a groove 100. Each of the structures 416 can have a groove 100 formed in a lower surface, also referred to as a ground-facing surface 102, as described with respect to groove 100. In other embodiments, more than one groove can be provided, similar to the grooves 100 shown in the heel sole structures 518 of FIG. 21.

The groove 100 enables the inventory 400 to be used in the manufacturing of different sizes of footwear. For example, a first forefoot sole structure indicated as forefoot sole structure 416A can be selected from the inventory 400, and then trimmed along the groove 100, resulting in a further forward, new transverse edge 28A, as indicated in FIG. 15. A second forefoot sole structure indicated as forefoot sole structure 416B is selected from the inventory 400, and is not trimmed along the groove 100 as shown in FIG. 16. The sole structure 416A has a length L3, referred to as a third length, along the longitudinal midline LM of the bladder element 44 from a forward longitudinal extremity 56 of the bladder element 44 to the new transverse edge 28A. The sole structure 416B has a length L4, referred to as a fourth length, along the longitudinal midline LM from the longitudinal extremity 56 to the transverse edge 28.

As shown in FIG. 17, the first forefoot sole structure 416A is attached to an upper 12A corresponding with the first footwear size after trimming at the groove 100. A first heel sole structure 18 is attached to the first upper 12A rearward of the first forefoot sole structure 416A with the new transverse edge 28A of the first forefoot sole structure 416A adjacent to and optionally abutting a forward edge 26 of the first heel sole structure 18 as shown in FIG. 19, resulting in a first article of footwear 410A. The second forefoot sole structure 416B is attached to a second upper 12B corresponding with the second footwear size without trimming along the groove 100, as shown in FIG. 18. A second heel sole structure 18 is attached to the second upper 12B rearward of the second forefoot sole structure 416B, with a rear edge 28 of the second forefoot sole 416B structure adjacent to and optionally abutting a forward edge 26 of the second heel sole structure 18, as shown in FIG. 20. The article of footwear 410A of FIG. 19 is a first footwear size while the article of footwear 410B of FIG. 20 is a larger second footwear size. In another embodiment, both the heel sole structure and the forefoot sole structure can have grooves 100. In such an embodiment, the heel sole structure 18A and the forefoot sole structure 416A can be attached to a first upper of the first footwear size, and the second heel sole structure 18B and the second forefoot sole structure 416B can be attached to a second upper of a footwear size larger than the first footwear size.

In another example method, an inventory 500 of substantially identical heel sole structures 518 can be provided as shown in FIG. 21. The heel sole structures 518 are identical to heel sole structures 18 except for an additional groove 100A provided in the ground-facing surface 102. Each of the structures 518 has a first groove 100 formed in a ground-facing surface 102 of the bladder element 70, as described with respect to groove 100 of FIG. 4. The ground-facing surface 102 of the polymeric bladder element 70 has a second groove 100A that extends from the lateral side 30 to the medial side 32, and is generally parallel with the first groove 100 and the transverse edge 26.

Figure 22:
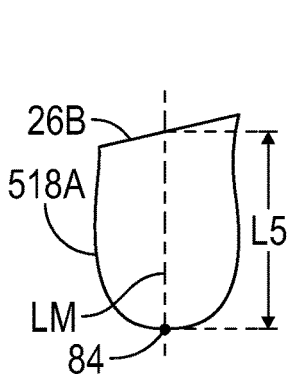
FIG. 22 is a schematic illustration of a heel sole structure selected from the inventory of FIG. 21 and trimmed at a second groove.
Figure 23:
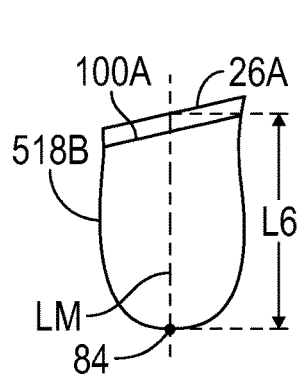
FIG. 23 is a schematic illustration of another heel sole structure selected from the inventory of FIG. 21 and trimmed at a first groove.
Figure 24:
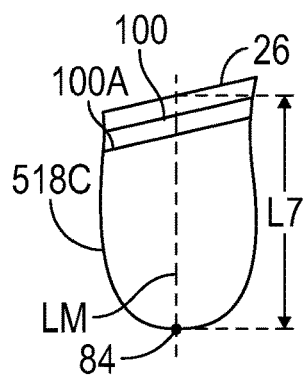
FIG. 24 is a schematic illustration of another heel sole structure selected from the inventory of FIG. 21.

The grooves 100, 100A enable the inventory 500 to be used in the manufacturing of different sizes of footwear. For example, a heel sole structure 518A from the inventory of heel sole structures 518 can be selected, and then trimmed along the groove 100A resulting in a new transverse edge 26B, as indicated in FIG. 22. The heel sole structure 518A is referred to herein as a third heel sole structure. Another heel sole structure 518B is selected from the inventory 500, and is trimmed along the groove 100 as indicted in FIG. 23, resulting in a new transverse edge 26A. Still another heel sole structure 518C is selected and is not trimmed along either groove 100 or 100A as indicated in FIG. 24. The sole structure 518A has a length L5 along the longitudinal midline of the bladder element 70 from a longitudinal extremity 84 of the bladder element 44 to the new transverse edge 26B created by trimming at the groove 100A. The sole structure 518B has a length L6 along the longitudinal midline LM from the longitudinal extremity 56 to the new transverse edge 26A. For example, the length L6 may be the same as length L1 of FIG. 4. The sole structure 518C has a length L7 along the longitudinal midline from the longitudinal extremity 56 to the transverse edge 26. The length L7 is the same as the length L2.

Figure 25:
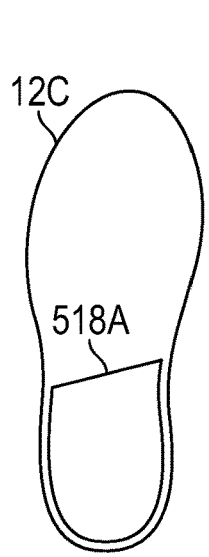
FIG. 25 is a schematic illustration of the heel sole structure of FIG. 22 attached to a first footwear upper.
Figure 26:
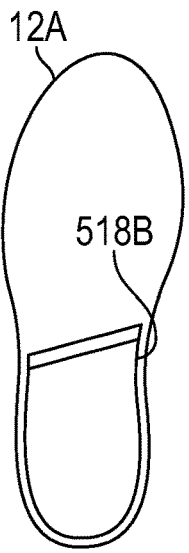
FIG. 26 is a schematic illustration of the heel sole structure of FIG. 23 attached to a second footwear upper.
Figure 27:
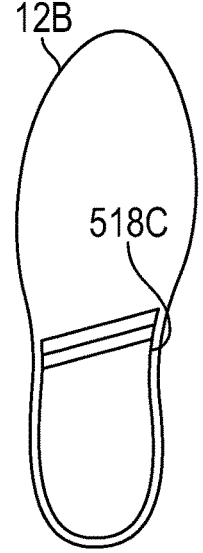
FIG. 27 is a schematic illustration of the heel sole structure of FIG. 24 attached to a third footwear upper.

The heel sole structure 518A is attached to an upper 12C as shown in FIG. 25 (referred to as a third upper) after trimming the heel sole structure 518A at the groove 100 of FIG. 21, resulting in the new transverse edge 26B as shown in FIG. 22. The upper 12C is a size corresponding with a third footwear size of an article of footwear 510A that is smaller than the first footwear size (i.e., smaller than the footwear size corresponding with the upper 12A). A forefoot sole structure 16 is attached to the upper 12C forward of the heel sole structure 518A with a rear edge 28 adjacent to the new transverse edge 26B of the heel sole structure 518A, resulting in article of footwear 510A as shown in FIG. 28. The heel sole structure 518B is attached to upper 12A. An identical forefoot sole structure 16 is attached to the upper 12A forward of the heel sole structure 518B, with a rear edge 28 adjacent to the transverse edge 26A of the heel sole structure 518B, resulting in the article of footwear 510B shown in FIG. 29. The forefoot sole structure 16 is attached to an upper 12B forward of the heel sole structure 518C, with a rear edge 28 adjacent the transverse edge 26 of the heel sole structure 518C, as shown in FIG. 30, resulting in article of footwear 510C. The article of footwear 510A of FIG. 28 is a third footwear size that is smaller than the second footwear size of the article of footwear 510B of FIG. 29 which in turn is smaller than the size of the article of footwear 510C of FIG. 30. For example, the third footwear size may be one-half size smaller than the first footwear size on the US footwear size scale. In this manner, identical heel sole structures 518 from the inventory 500 are used in the manufacturing of three different sizes of footwear.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:

1. A method of manufacturing an article of footwear comprising:
selecting a first sole structure from an inventory of substantially identical sole structures; wherein each of the substantially identical sole structures includes:
a polymeric bladder element enclosing a fluid-filled interior cavity;
wherein the polymeric bladder element has:
a transverse edge extending from a lateral side of the polymeric bladder element to a medial side of the polymeric bladder element;
a groove that is displaced from a ground-engaging surface of the sole structure and that extends continuously alongside the transverse edge from the lateral side to the medial side; and
a reduced thickness at the groove;
trimming the first sole structure along the groove resulting in a new transverse edge;
after said trimming, attaching the first sole structure to a first footwear upper with the new transverse edge at a midfoot region of the article of footwear;
selecting a second sole structure from the inventory;
attaching the second sole structure to a second footwear upper without trimming along the groove of the second sole structure; and
wherein the first footwear upper and the first sole structure correspond with a first footwear size, and the second footwear upper and the second sole structure correspond with a second footwear size larger than the first footwear size.

2. The method of claim 1, wherein:
the first sole structure is a first heel sole structure attached to a heel region of the first footwear upper;
the polymeric bladder element of the first sole structure is a first heel bladder element the second sole structure is a second heel sole structure attached to a heel region of the second footwear upper;
the polymeric bladder element of the second sole structure is a second heel bladder element; and the method further comprising:
attaching a first forefoot sole structure to the first footwear upper forward of the first heel sole structure, with a rear edge of the first forefoot sole structure adjacent to the new transverse edge of the first heel bladder element; and
attaching a second forefoot sole structure to the second footwear upper forward of the second heel sole structure, with a rear edge of the second forefoot sole structure adjacent to the transverse edge of the second heel bladder element.

3. The method of claim 2, wherein the first forefoot sole structure and the second forefoot sole structure are selected from an inventory of substantially identical forefoot sole structures, each including:
a polymeric forefoot bladder element enclosing a fluid-filled interior cavity;
wherein:
the polymeric forefoot bladder element has a transverse edge extending from the lateral side of the polymeric forefoot bladder element to the medial side of the polymeric forefoot bladder element;
the fluid-filled interior cavity of the polymeric forefoot bladder element of the first forefoot sole structure is isolated from the fluid-filled interior cavity of the first heel bladder element of the first heel sole structure; and
the fluid-filled interior cavity of the polymeric forefoot bladder element of the second forefoot sole structure is isolated from the fluid-filled interior cavity of the second heel bladder element of the second heel sole structure.

4. The method of claim 2, further comprising:
abutting the rear edge of the first forefoot sole structure against the new transverse edge of the first heel bladder element; and
abutting the rear edge of the second forefoot sole structure against the transverse edge of the second heel bladder element.

5. The method of claim 1, wherein:
the first sole structure is a first forefoot sole structure attached to a forefoot region of the first footwear upper;
the polymeric bladder element of the first sole structure is a first forefoot bladder element;
the second sole structure is a second forefoot sole structure attached to a forefoot region of the second footwear upper;
the polymeric bladder element of the second sole structure is a second forefoot bladder element, and the method further comprising:
attaching a first heel sole structure to the first footwear upper rearward of the first forefoot sole structure, with a forward edge of the first heel sole structure adjacent to the new transverse edge of the first forefoot bladder element; and attaching a second heel sole structure to the second footwear upper rearward of the second forefoot sole structure, with a forward edge of the second heel sole structure adjacent to the transverse edge of the second forefoot bladder element.

6. The method of claim 1, wherein:

the groove is a first groove;

the polymeric bladder element has a second groove that extends from the lateral side to the medial side and is adjacent to the first groove;

the method further comprising:

selecting a third sole structure from the inventory of substantially identical sole structures;

trimming along the second groove of the third sole structure;

attaching the third sole structure to a third footwear upper; and wherein the third footwear upper and the third sole structure correspond to a third footwear size smaller than the first footwear size.

7. The method of claim 1, wherein the second footwear size is one-half size larger than the first footwear size on a United States (US) footwear size scale.

8. The method of claim 1, further comprising:

placing polymeric material in a mold cavity of a mold of the polymeric bladder element; wherein the mold has a mold surface with a protrusion; and conforming the polymeric material to the mold surface, with the protrusion forming the groove in the polymeric material.

9. The method of claim 8, wherein:

the polymeric material includes first and second polymeric sheets; and said conforming includes:

heating the first and second polymeric sheets; and applying a vacuum to the first and second polymeric sheets.

10. The method of claim 9, further comprising:

thermally bonding the first and second polymeric sheets to one another to define a peripheral flange of the polymeric bladder element.

11. The method of claim 10, further comprising:

inflating the polymeric bladder element.

12. The method of claim 1, wherein:

the first sole structure is a first forefoot sole structure attached to a forefoot region of the first footwear upper; and the second sole structure is a second forefoot sole structure attached to a forefoot region of the second footwear upper;

the method further comprising:

attaching a first heel sole structure to the first footwear upper rearward of the first forefoot sole structure, with the new transverse edge of the polymeric bladder element of the first forefoot sole structure adjacent to a forward edge of the first heel sole structure; and attaching a second heel sole structure to the second footwear upper rearward of the second forefoot sole structure, with the transverse edge of the polymeric bladder element of the second forefoot sole structure adjacent to a forward edge of the second heel sole structure.

* * * * *